April 28, 1953      A. M. LEWIS      2,636,969
BUN WARMER

Filed April 7, 1951      3 Sheets-Sheet 1

INVENTOR.
ALBERT M. LEWIS.
BY Thos. S. Donnelly
ATTORNEY.

April 28, 1953          A. M. LEWIS          2,636,969
BUN WARMER

Filed April 7, 1951          3 Sheets-Sheet 3

INVENTOR.
ALBERT M. LEWIS
BY
*Thos. L. Donnelly*
ATTORNEY.

Patented Apr. 28, 1953

2,636,969

UNITED STATES PATENT OFFICE 2,636,969

BUN WARMER

Albert M. Lewis, Grosse Pointe Woods, Mich.

Application April 7, 1951, Serial No. 219,836

7 Claims. (Cl. 219—19)

My invention relates to a new and useful improvement in a bun warmer adapted for use in warming and refreshening buns. The invention lends itself particularly for use in sandwich shops in which places it is customary to serve the sandwich on a warm bun.

It is an object of the present invention to provide a bun warmer which will be simple in structure, economical of manufacture, durable, compact, easily operated and highly efficient in use.

Another object of the invention is the provision of a bun warmer having a heating element adapted for converting water rapidly into steam and also provided with an injection mechanism for injecting a predetermined amount of water into the heating reservoir.

Another object of the invention is the provision of a mechanism whereby the injection mechanism may be controlled and its operativeness determined.

Another object of the invention is the provision in a bun warmer for a means of delivering the water into the heating reservoir in an atomized condition.

Other objects will appear hereinafter.

It is recognized that various modifications and changes may be made in the detail of structure illustrated without departing from the invention and it is intended that the present disclosure shall be considered but the preferred embodiment.

Forming a part of this application are drawings in which,

Fig. 6 is a fragmentary sectional view showing a slight modification.

Figures 1, 2:
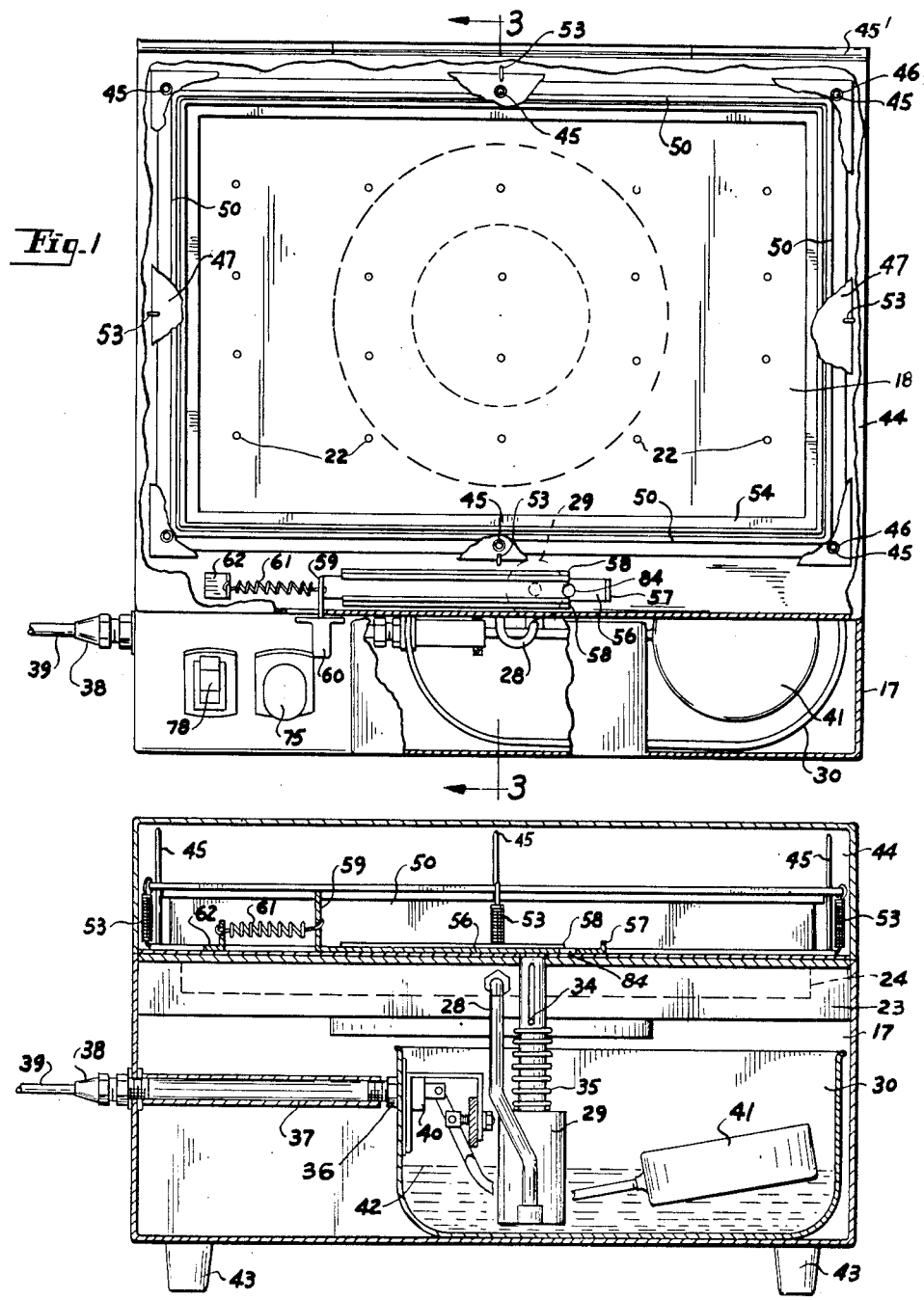
Fig. 1 is a top plan view of the invention with parts broken away.
Fig. 2 is a sectional view taken on line 2—2 of Fig. 1.

As shown in the drawings, I use a lower section comprising a box-like structure 17 having its upper end closed by a plate 18. Secured to the plate 18, and underlying the same, is a housing 19 in which is positioned an electrical heating element 20, the screws 21 serving to retain the housing 19 in position. This housing 19 is positioned in a chamber 24 which may be termed a water heating chamber or reservoir. This chamber 24 is formed in the plate 23 which is secured to the under surface of the plate 18 by means of the screws 25. Formed in this plate 18 in spaced apart relation are the openings 22, these openings communicating with the heating chamber or reservoir 24. (See Fig. 1 and Fig. 2.) A pipe 26 extends into this heating chamber or reservoir 24 and is provided, at the portion lying within the chamber, with spaced apart openings 79, the end of this pipe being closed by a suitable plug 80. This pipe 26 is secured, by means of the fitting 27, in communication with the pipe 28, which communicates with the bottom of the cylinder 29. This cylinder 29 is positioned in a water receiving tank 30 and the cylinder 29 communicates at its bottom through a check valve 31 with the interior of the tank 30. Slidable in the cylinder 29 is a piston 32, having a piston rod 33 which projects upwardly therefrom and on which is mounted the pin 34, bearing against one end of which is a coil spring 35 and the other end bearing against the top of the cylinder 29. This spring 35 normally retains the piston 32 elevated in the cylinder 29 and the construction is such that upon downward pressure on the rod 33 the piston 32 will force a predetermined amount of water throug the pipes 28 and 26 to discharge the same through the openings 79 into the heating chamber or reservoir 24. As the piston 32 moves upwardly in response to the pressure of the spring 35 water again will be drawn in the cylinder 29 through the check valve 31.

By means of the fitting 36 the pipe 37 is secured, as shown in Fig. 2, in communication with the interior of the tank 30 and this pipe 37 is connected by the fitting 38 with the pipe 39, which is connected to a suitable source of water under pressure, such as the city supply. A float operated check valve 40 is operated by the float 41 to control the delivery of liquid into the tank 30, so that the normal level 42 of liquid in the tank will be sufficiently high to assure the entry of liquid into the cylinder 29. This lower section is supported by the feet 43 which are secured thereto.

A box-like cover 44 is hingedly mounted at 45' on the lower section 17 so that it may be swung upwardly at its forward end relatively to this lower section. (See Fig. 3.) Projecting upwardly at the front and rear of this upper section are guide posts 45 which extend through openings 46 formed in a presser plate 47. A spring 48 is connected at its upper end to the plate 47 and at its lower end to a flange 49, which is carried by the cover and which has the upwardly turned portion 50 to serve as an abutment against which the plate 47 may engage. A spring 53 is connected at one end to the presser plate 47 and at its opposite end to a flange 51 carried by the cover 44. It is thus seen that the plates 47 and 18 are in spaced apart relation and that there is thus provided a chamber 81 between these plates. The construction is such that steam forming in the heating chamber or reservoir 24 will pass through the fine openings 22 into this chamber 81 and serve to heat or warm buns which may be positioned therein. Mounted on the upper surface of the plate 18 and extending around the same is an angle iron 54 which serves as a frame to properly locate the buns positioned within the frame. When the buns are positioned in the frame the cover is lowered and the plate 47 will bear against these buns unless they are of less thickness than the height of the member 50. This member 50 will be made of such height that ordinarily when the bun is placed in position and the cover lowered the bun will be under slight pressure between plates 47 and 18.

Figure 5:
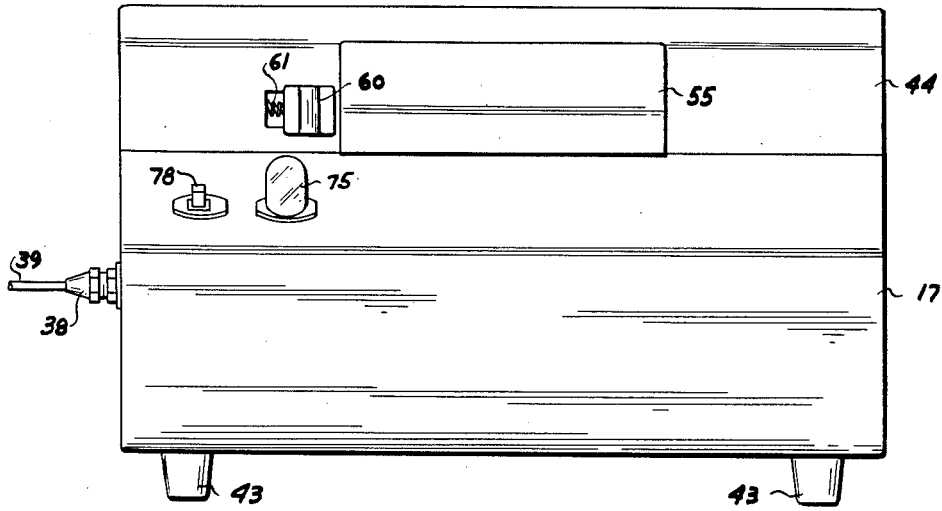
Fig. 5 is a front elevational view of the invention.

Slidable between the guide plates 82 and 83, carried by the cover in spaced apart relation, is a guard plate 56 which is provided at one end with a flange 57. (See Fig. 2 and Fig. 3.) Adjacent this end there is an opening 84 formed therein. The opposite end of the plate 56 is provided with the angularly directed tongue 59 carrying at its end the knob 60 (see Fig. 5) which extends into the hollow handle 55 mounted on the forward end of the cover. This guard plate 56 is adapted to overlie the piston rod 33. A spring 61 is attached at one end to the tongue 59 and at the opposite end to a bracket 62 carried by the cover, so that the plate 56 is normally held in position with the opening 84 registering with the piston rod 33. (See Fig. 2.) When the plate 56 is in the normal position of slidable movement in response to the tension of the spring 61 so that the opening 84 registers with the piston rod 33, a lowering of the cover into closing position will not affect the piston rod. This would be the normal position when the apparatus is not in use. When the apparatus is in use and buns have been placed on the plate 18, the operator, upon lowering the cover would, with the thumb or finger pressing against the member 60, slide the plate into the position shown in Fig. 1 so that the opening 84 would be out of registration with the piston rod 33. A lowering of the cover, therefore, to fully closed position would bring the member 56 into engagement with the end of the piston rod 33 and force the piston 32 downwardly a predetermined distance to eject through the pipe 26 a predetermined amount of water. This water would, on account of the temperature maintained in the heating reservoir or chamber 24, be instantly turned into steam and passed through the openings 22, thus warming and moistening or refreshening the buns which may be positioned between the plates 18 and 47.

The electric wires 63 and 64 are adapted to be connected to a source of electrical energy by means of the socket plug 65. The wire 64 connects through a thermostat 66 and the wire 67 to a terminal 68 of a switch contained within the switch housing 77 and operated by the switch toggle 78. (See Fig. 3.) Upon a closing of the switch the terminal 68 would be in connection with the terminal 69, which is connected by the wire 70 to one of the terminals 71 of the electrical heating element 20. The other terminal 72 of the heating element is connected by the wire 73 through the switch terminals 74 to the wires 63. The expansible portions 76 of the thermostat are in close proximity to the plate 23 in which the heating chamber or reservoir 24 is formed, so that this thermostat is responsive to the temperature of the heating chamber or reservoir 24. Connected into the circuit to the switch housing 77 is a light bulb 75 to indicate when the heating element is on.

Experience has shown that with a bun warmer of this type the buns may be placed in position and the cover lowered and the water ejected and it is possible to almost instantly raise the cover and find the buns properly heated and steamed.

By use of the guard plate 56 it also becomes possible to place buns between the plates 18 and 47 to prematurely warm them without causing any steaming of the same. This is accomplished by lowering the cover 44 while the opening 84 of the guard plate 56 is in registration with the rod 33. The electric heating element 20 will, of course, serve to keep the plate 18 hot.

Figure 3:
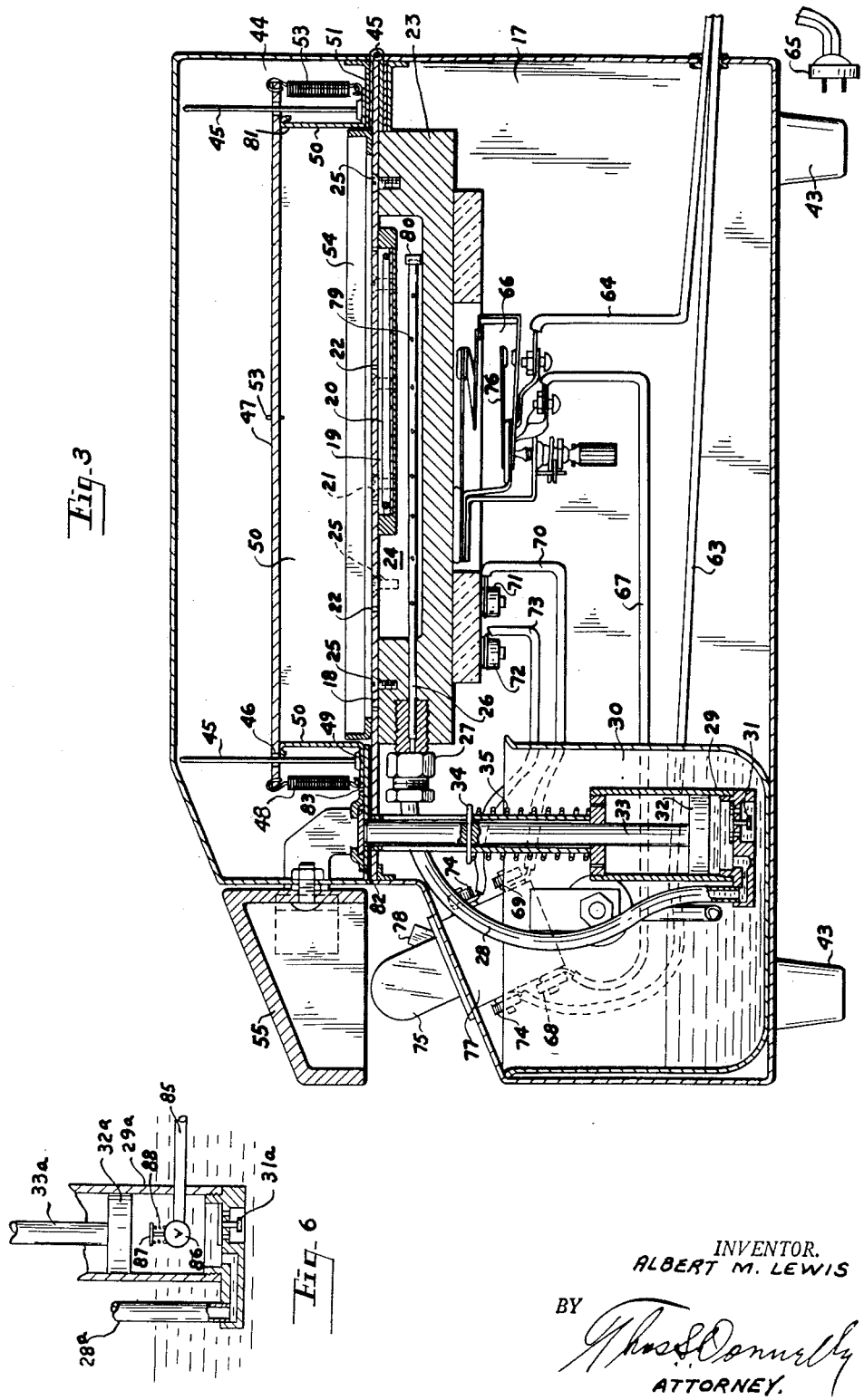
Fig. 3 is a sectional view taken on line 3—3 of Fig. 1.
Figure 4:
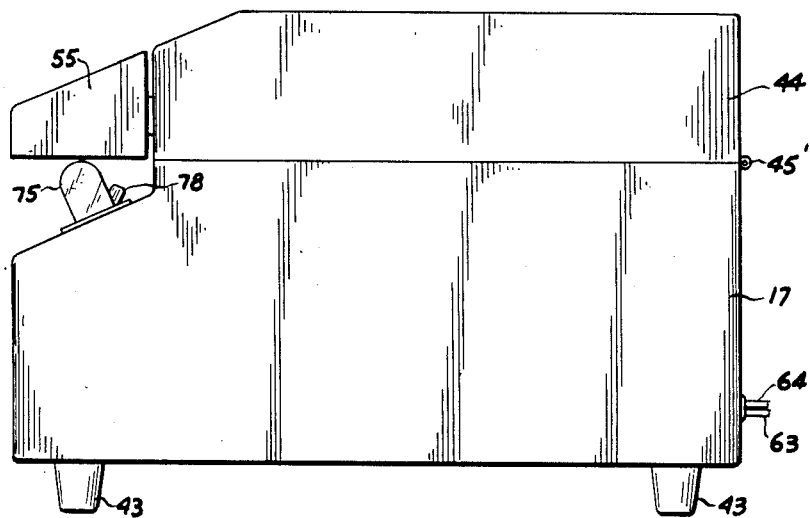
Fig. 4 is a side elevational view of the invention.

In Fig. 6 I have shown a slight modification in which an air pipe 85 communicates through the valve 86 with a cylinder 29a corresponding to the cylinder 29 shown in Fig. 3. This communication is below the piston 32a having the piston rod 33a. The cylinder 29a is adapted to communicate with the interior of the tank 30 through the check valve 31a and leading from the cylinder 29a is a pipe 28a corresponding to the pipe 28 of Fig. 3. The construction is such that as the piston 32a is about to complete its downward stroke it will strike the plunger 87 which is normally held in position by the spring 88 to maintain the valve 86 closed. As soon as the plunger 87 moves into valve closing position air will be permitted to mingle with the liquid passing outwardly through the pipe 28a so that the water is atomized. Experience has shown that the use of the air for atomizing will effect a slightly quicker generating of the steam in the heating chamber or reservoir.

It is intended that the abutment 50 shall be of such a height that with the conventional type of bun or roll the presser plate 47 will not contact this abutment but will press against the bun or roll placed on the plate 18. These buns or rolls will, of course, overlie, and thus serve as a closure for, the ends of the openings 22, so that the steam generated in the heating chamber or reservoir 24 will develop considerable pressure. This will, of course, raise the temperature of the steam and increase its efficiency for heating purposes, so that the steam used for heating purposes is of a super-heated nature. Experience has shown that the steam generated in the heating reservoir or chamber 24 passing through the openings 22 will break through the crust of the bun or roll and penetrate the same, thus heating the interior as well as the exterior.

In addition to heating or refreshening baked products the device may also be used for heating other products such as frankfurters.

If desired, articles to be sterilized may be laid upon the plate 18 and when the cover is lowered and the steam passes into the article containing chamber 81 a sterilization of the article will be easily and quickly effected.

What I claim is:

1. In a bun warmer of the class described a bun supporting plate having a plurality of spaced apart openings formed therethrough; a swingable cover swingable into covering position relatively to said plate in spaced relation thereto; and a movable presser plate positioned within and carried by said cover and engageable with a bun positioned on said plate for pressing the same thereagainst; and springs on said presser plate normally moving the same into pressing position; and abutment members carried by said cover for limiting the movement of said presser plate toward pressing position.

2. In a bun warmer of the class described a housing embodying a lower box-like section; a cover plate mounted on said box-like section for closing the upper end thereof, a plate secured to said cover plate and positioned below the same and having a heating chamber therein, said cover plate having a plurality of openings formed therethrough; a heating element for heating said chamber; a delivery pipe extending into said chamber for delivering water thereinto; a movable plunger adapted for moving in one direction for forcing a predetermined amount of water through said pipe; a rod connected to said plunger; a cover swingably mounted on said lower section and swingable to covering and uncovering position; and a spring normally urging said rod upwardly into the path of said cover; the closing of said cover effecting a movement of said plunger in said direction a predetermined distance; and a guard plate carried by said cover and having an opening formed therethrough and movable for registering with said rod, said rod, upon the closing of said cover, being projectable through said opening.

3. In a bun warmer of the class described a housing embodying a lower box-like section; a cover plate mounted on said box-like section for closing the upper end thereof; a plate secured to said cover plate and positioned below the same and having a heating chamber therein, said cover plate having a plurality of openings formed therethrough; a heating element for heating said chamber; a delivery pipe extending into said chamber for delivering water thereinto; a movable plunger adapted for moving in one direction for forcing a predetermined amount of water through said pipe; a rod connected to said plunger; a cover swingably mounted on said lower section and swingable to covering and uncovering position; and a spring normally urging said rod upwardly into the path of said cover, the closing of said cover effecting a movement of said plunger in said direction a predetermined distance; and a guard plate carried by said cover and having an opening formed therethrough and movable for registering with said rod, said rod, upon the closing of said cover, being projectable through said opening; and a spring connected to said guard plate, normally moving said guard plate into position for registering said opening with said rod.

4. A bun warmer of the class described comprising a lower box-like section open at its upper end; a plate mounted on the upper end of said section and serving as a closure therefor and having a plurality of openings formed therethrough; a plate mounted on the lower side of said cover plate and having a heating chamber formed in its upper face; a heating element for heating said heating chamber; a delivery pipe extending into said chamber for delivering water thereinto; a water receiving tank; a cylinder in said tank adapted for reception of water therefrom; a piston slidable in said cylinder; a piston rod on said piston projecting upwardly therefrom; a conduit for connecting said cylinder to said pipe in such a manner that the movement of said piston in said cylinder in one direction will force a predetermined amount of water through said pipe; a cover swingably mounted on said lower section and swingable into covering and uncovering position; a slidable guard plate on said cover and having an opening therethrough and overlying the upper end of said rod; a spring for normally maintaining said guard plate moved into position for retaining said opening in registration with said rod, said rod, upon the moving of said cover to covering position, projecting through said opening.

5. A bun warmer of the class described comprising a lower box-like section open at its upper end; a plate mounted on the upper end of said section and serving as a closure therefor and having a plurality of openings formed therethrough; a plate mounted on the lower side of said cover plate and having a heating chamber formed in its upper face; a heating element for heating said heating chamber; a delivery pipe extending into said chamber for delivering water thereinto; a water receiving tank; a cylinder in said tank adapted for reception of water therefrom; a piston slidable in said cylinder; a piston rod on said piston projecting upwardly therefrom; a conduit for connecting said cylinder to said pipe in such a manner that the movement of said piston in said cylinder in one direction will force a predetermined amount of water through said pipe; a cover swingably mounted on said lower section and swingable into covering and uncovering position; a slidable guard plate on said cover and having an opening therethrough and overlying the upper end of said rod; a spring for normally maintaining said guard plate moved into position for retaining said opening in registration with said rod, said rod, upon the moving of said cover to covering position, projecting through said opening, said guard plate being movable manually into position for moving said opening out of registration with said rod, and said guard plate, upon movement to said nonregistering position, upon the movement of said cover to covering position engaging said rod and moving said piston to force a predetermined amount of liquid out of said cylinder through said pipe.

6. A bun warmer of the class described comprising a lower box-like section open at its upper end; a plate mounted on the upper end of said section and serving as a closure therefor and having a plurality of openings formed therethrough; a plate mounted on the lower side of said cover plate and having a heating chamber formed in its upper face; a heating element for heating said heating chamber; a delivery pipe extending into said chamber for delivering water thereinto; a water receiving tank; a cylinder in said tank adapted for reception of water therefrom; a piston slidable in said cylinder; a piston rod on said piston projecting upwardly therefrom; a conduit for connecting said cylinder to said pipe in such a manner that the movement of said piston in said cylinder in one direction will force a predetermined amount of water through said pipe; a cover swingably mounted on said lower section and swingable into covering and uncovering position; a slidable guard plate on said cover and having an opening therethrough and overlying the upper end of said rod; a spring for normally maintaining said guard plate moved into position for retaining said opening in registration with said rod, said rod, upon the moving of said cover to covering position, projecting through said opening, said guard plate being movable manually into position for moving said opening out of registration with said rod, and said guard plate, upon movement to said non-registering position, upon the movement of said cover to covering position engaging said rod and moving said piston to force a predetermined amount of liquid out of said cylinder through said pipe; a conduit for delivering air under pressure and communicable with said pipe; a valve for controlling communication of said air conduit with said pipe; and means operable, upon movement of said cover to covering position, for opening said valve to permit a jet of air to pass through said pipe simultaneously with the water delivered thereto.

7. A bun warmer of the class described comprising a lower box-like section open at its upper end; a plate mounted on the upper end of said section and serving as a closure therefor and having a plurality of openings formed therethrough; a plate mounted on the lower side of said cover plate and having a heating chamber formed in its upper face; a heating element for heating said heating chamber; a delivery pipe extending into said chamber for delivering water thereinto; a water receiving tank; a cylinder in said tank adapted for reception of water therefrom; a piston slidable in said cylinder; a piston rod on said piston projecting upwardly therefrom; a conduit for connecting said cylinder to said pipe in such a manner that the movement of said piston in said cylinder in one direction will force a predetermined amount of water through said pipe; a cover swingably mounted on said lower section and swingable into covering and uncovering position; a slidable guard plate on said cover and having an opening therethrough and overlying the upper end of said rod; a spring for normally maintaining said guard plate moved into position for retaining said opening in registration with said rod, said rod, upon the moving of said cover to covering position, projecting through said opening, said guard plate being movable manually into position for moving said opening out of registration with said rod, and said guard plate, upon movement to said non-registering position, upon the movement of said cover to covering position engaging said rod and moving said piston to force a predetermined amount of liquid out of said cylinder through said pipe; a conduit for delivering air under pressure and communicable with said pipe; a valve for controlling communication of said air conduit with said pipe; and means operable, upon movement of said cover to covering position, for opening said valve to permit a jet of air to pass through said pipe simultaneously with the water delivered thereto; and float operated means for maintaining a predetermined liquid level in said tank.

ALBERT M. LEWIS.

References Cited in the file of this patent

UNITED STATES PATENTS

| Number | Name | Date |
|---|---|---|
| 1,318,246 | Underwood | Oct. 7, 1919 |
| 1,580,293 | Fitzer | Apr. 13, 1926 |
| 1,687,521 | Stallworth | Oct. 16, 1928 |
| 2,102,342 | Walder | Dec. 14, 1937 |
| 2,109,326 | Tricomi et al. | Feb. 22, 1938 |
| 2,110,559 | Smith | Mar. 8, 1938 |
| 2,137,876 | Hudson | Nov. 22, 1938 |
| 2,230,483 | Gough | Feb. 4, 1941 |
| 2,244,145 | Erickson | June 3, 1941 |
| 2,469,778 | Morici | May 10, 1949 |
| 2,532,014 | Davis | Nov. 28, 1950 |